UNITED STATES PATENT OFFICE.

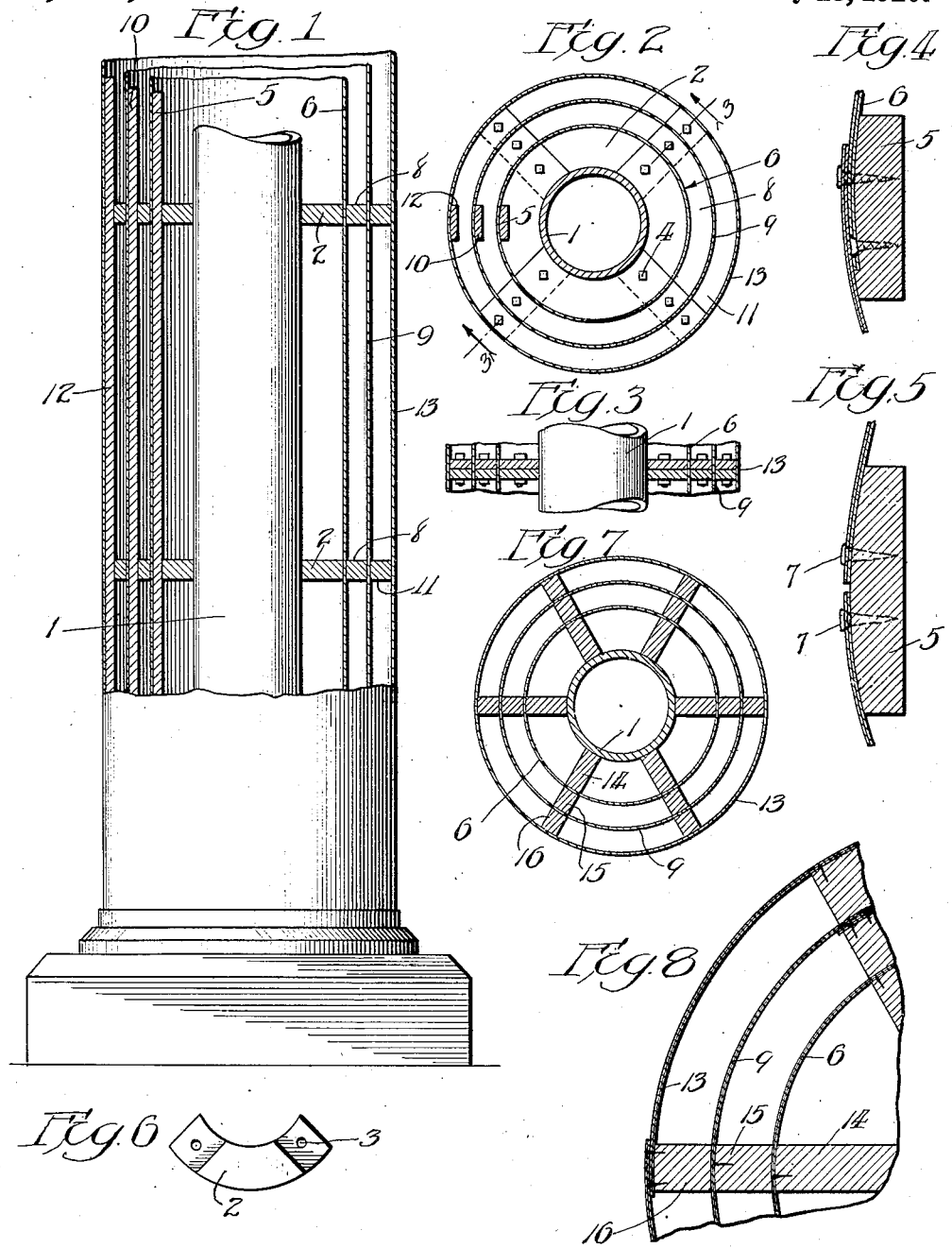

JAMES R. FITZPATRICK, OF GRAND RAPIDS, MICHIGAN, ASSIGNOR TO HASKELITE MANUFACTURING CORPORATION, A CORPORATION OF NEW YORK.

FROST-CASING.

1,340,332.   Specification of Letters Patent.   Patented May 18, 1920.

Application filed February 8, 1919. Serial No. 275,748.

*To all whom it may concern:*

Be it known that I, JAMES R. FITZPATRICK, a citizen of the United States, residing at Grand Rapids, county of Kent, State of Michigan, have invented a certain new and useful Improvement in Frost-Casings, and I declare the following to be a full, clear, and exact description of the same, such as will enable others skilled in the art to which it pertains to make and use the same, reference being had to the accompanying drawings, which form a part of this specification.

A method commonly used for protecting riser pipes to water tanks and the like, where the pipes are exposed to the weather, is to surround them with a plurality of concentric wooden shells or casings separated from each other and from the pipes so as to form air chambers. The usual so-called frost casing is made of dressed, matched and beaded lumber assembled on the job, so that the assembling of one of these structures is quite an expensive process. In case a pipe protected by such a casing freezes, it is necessary completely to dismantle the casing and replace it by a new one. Furthermore, because of the numerous pieces in each individual shell, it is difficult to secure the requisite tightness and, because of the tendency of the numerous pieces to warp, it is difficult to maintain tightness of joints. In short, the ordinary frost-proof casing is expensive and not wholly satisfactory. The object of the present invention is to produce a simple and novel frost-proof casing for pipes which shall be cheaper than the old type, be readily set up, and effectively maintain tightly sealed insulating chambers around the member to be protected. A further object of the present invention is to produce a frost-proof casing which, in case of necessity, may be removed and again put back in place instead of being discarded as is now generally the case.

Broadly speaking, my invention may be said to have for its object generally to improve the construction and efficiency of frost-proof casings.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a view partly in side elevation and partly in section illustrating the lower end of a pipe or riser protected by a casing arranged in accordance with a preferred form of my invention;

Fig. 2 is a transverse section through the structure shown in Fig. 1;

Fig. 3 is a section taken approximately on line 3—3 of Fig. 2;

Fig. 4 is a cross section, on an enlarged scale, illustrating a detail of the connection between one of the shells and the nailing strip;

Fig. 5 is a view similar to Fig. 4, illustrating a modification;

Fig. 6 is a plan view of one section of one of the sectional rings;

Fig. 7 is a section similar to Fig. 2, showing a modified arrangement; and

Fig. 8 is a section similar to Fig. 7, on an enlarged scale, showing only a fragment of the casing.

Referring to Figs. 1 to 6 of the drawing, 1 represents a pipe or riser to be protected. Surrounding the pipe or riser 1 are a plurality of rings of wood, 2, distributed along the pipe or riser at suitable distances apart. Each of the rings may be made up of a plurality of sections such as indicated in Fig. 6, overlapping at their ends and provided with registering bolt holes, 3, through which bolts, 4, may be passed. After the rings 2 have been secured about the pipe or riser, a vertical nailing strip, 5, is nailed or otherwise fastened to the rings. A sheet, 6, of laminated wood veneer is then attached at one edge to the nailing strip and is bent entirely around and in contact with the rings 2 until the free edge reaches the nailing strip, where it is fastened. The laminated wood veneer may be of any suitable type, but I prefer to use that type which is known as "haskelite" which has the properties of resisting heat and moisture; "haskelite" being a laminated wood veneer cemented together under heat and pressure with a glue composed of black albumen dissolved in a quantity of water by weight somewhat greater than the weight of the dry albumen and thoroughly mixed with a solution of sodium silicate containing sufficient sodium silicate to give to the glue a syrupy consistency. The joint between the veneer and the nailing strip may be made perfectly tight by placing a narrow strip or stripe of glue on the inner face of the sheet of veneer, in proximity to the two vertical edges and then nailing or otherwise mechanically fastening the veneer to the nailing strip at numerous points. The joint between the meeting ends of the veneer may be either a lap joint as indicated in Fig. 4 or a butt joint as indicated in Fig. 5. For some purposes the joint shown in Fig. 5 may be somewhat preferable. Thus by placing the glue close to each of the two vertical edges and then nailing close to these edges, as indicated at 7, it is possible to remove the sheet substantially intact by simply making vertical sawcuts a short distance from each vertical edge, without attempting to withdraw the nails or break the glue joint. This same expedient may also be adopted with the construction shown in Fig. 4 if the parts are properly proportioned.

After the first shell has been placed in position, another series of rings, 8, is added, and then a shell, 9, similar to the one heretofore described, is placed around these rings and secured to a nailing strip, 10, similar to the strip 5. If desired, a third set of rings, 11, a third nailing strip, 12, and a third laminated veneer casing 13, may be employed. It will be seen that each pair of rings forms the upper and lower walls of an airtight compartment extending completely around the pipe or riser; communication between one compartment and another being however, completely shut off. It will also be seen that because of the nature of the laminated wood veneer there is only one vertical joint in each shell instead of the numerous joints in the old type of construction heretofore described, and this single joint may easily be so made that the compartments will be airtight not only when initially built but throughout the entire life of the structure.

If desired, the several compartments or air cells surrounding the riser or column and located between the pipe or riser and the adjacent shell or between two consecutive shells, may be separated from each other angularly of the pipe or riser and be continuous from one end of the latter to the other in the vertical direction. Such an arrangement is illustrated in Figs. 7 and 8. Instead of the rings or collars employed in the construction heretofore described, a plurality of uprights, 14, are placed around the column or riser, and the first shell or casing 6 is bent around and fastened to these; one of the uprights taking the place of the nailing strip heretofore described. After the inner shell has been completed, a second set of uprights, 15, may be set up around the same; the second inclosing shell, 9, being bent around and attached to the second set of strips. In the same way, a third set of uprights, 16, and a third inclosing shell, 13, may be added. If desired the vertical joints may be staggered as illustrated in Fig. 8, so that no two joints come in the same radial plane.

The material for each of the several forms of frost-proof casing illustrated may be shipped in a flat state but, if desired, it may be wholly or partially molded or shaped or fabricated. Furthermore, if it should for any reason be desired to make more than one vertical joint in each shell, this could of course be done. It will also be understood that the casing may be made of as many sections arranged one above the other, as may be desired. Thus, for example, the upper set of rings or collars in Fig. 1 might be placed in the joint between a lower series of sheets and the next series immediately above the latter, so that by gluing and nailing the veneer to the rings or collars an airtight joint may be obtained between the upper and lower members of each shell.

I claim:

1. The combination with a riser, of a plurality of concentric shells of laminated wood veneer surrounding the same, and spacing members between the riser and the inner shell and between each two adjacent shells for holding them apart and forming within each shell a series of air chambers separated from each other.

2. The combination with a riser, of a single sheet of wood veneer bent around the same in the form of a cylinder, the two ends of the sheet being secured together by a tight joint, and spacing devices between the riser and the shell.

3. The combination with a riser, of a plurality of concentric shells formed of sheets of laminated wood veneer bent around the same and spaced apart from each other, and vertical pieces arranged inside of the shells at the meeting edges of the sheets and attached thereto so as to produce tight joints.

4. The combination with a riser, of a plurality of rings or collars surrounding the same, of a vertical nailing strip attached to said rings or collars, and a sheet of laminated wood veneer bent around and lying in contact with said collars, the free ends of the sheet being attached to said nailing strip.

5. The combination with a riser, of a shell made of a sheet of laminated wood veneer bent around the same, and means between the riser and the shell for supporting and spacing the shell apart from the riser, said means including a vertical member adapted to overlie the joint between the free vertical edges of the sheet and serve as a nailing strip for the latter.

In testimony whereof, I sign this specification.

JAMES R. FITZPATRICK.